United States Patent [19]

Legoult

[11] Patent Number: 4,510,401

[45] Date of Patent: Apr. 9, 1985

[54] PROCESSES AND DEVICES FOR PROVIDING A LOAD WITH AN ELECTRIC AC SUPPLY WITHOUT DISCONTINUITY OF THE AC SIGNAL

[75] Inventor: Michel Legoult, Dammarie les Lys, France

[73] Assignee: Etablissements-Pierre Fontaine, Chilly Mazarin, France

[21] Appl. No.: 479,179

[22] Filed: Mar. 28, 1983

[51] Int. Cl.³ .............................................. H02J 9/06
[52] U.S. Cl. ........................................ 307/66; 307/87
[58] Field of Search .......................... 307/66, 87, 129

[56] References Cited

U.S. PATENT DOCUMENTS

| | | | |
|---|---|---|---|
| 3,925,772 | 12/1975 | Miller et al. | 307/66 X |
| 4,010,381 | 3/1977 | Fickenscher | 307/66 |
| 4,238,691 | 12/1980 | Ebert, Jr. | 307/87 X |
| 4,400,624 | 8/1983 | Ebert, Jr. | 307/66 X |
| 4,400,625 | 8/1983 | Hussy | 307/66 |

*Primary Examiner*—A. D. Pellinen
*Assistant Examiner*—Derek Jennings
*Attorney, Agent, or Firm*—Larson and Taylor

[57] ABSTRACT

An AC electric supply of a load capable of selectively connecting a main AC power source through a first primary transformer winding or an auxiliary emergency source such as from a battery power supply through a static DC-AC converter through a second primary transformer winding, the load being connected to the secondary transformer winding. The process includes sensing the voltage of the main source and automatically connecting the auxiliary emergency source when low voltage is detected and reconnecting the main source and disconnecting the auxiliary source when the disappearance of the failure of the main source is detected by first causing the auxiliary source frequency to drift, comparing the frequency between the auxiliary source and the resupplied main source, and when the two frequencies are in coincidence, connecting the main source and disconnecting the auxiliary source. An electric supply device comprises a transformer, a main electric AC source connected to the primary of the transformer and an auxiliary electric source connected to a second primary winding of the transformer, a voltage detector for detecting low voltage of the main electric source, and controlled switches for selectively connecting either the auxiliary power supply or the main power supply, and a synchronization detector which detects when the frequency of the main power supply and the auxiliary power supply are in coincidence and controls the switches to switch from the auxiliary power supply to the main power supply.

11 Claims, 2 Drawing Figures

PROCESSES AND DEVICES FOR PROVIDING A LOAD WITH AN ELECTRIC AC SUPPLY WITHOUT DISCONTINUITY OF THE AC SIGNAL

FIELD OF THE INVENTION

The present invention relates to improvements to the uninterruptable AC electric supply of a load, that is to say supplying electric AC energy without interruption to a load whatever the state (operating or broken down) of the main AC supply source (generally the mains), switching over from the main AC supply source to an auxiliary emergency supply source and vice-versa being required to take place without discontinuity or frequency jump of the AC signal delivered to the load.

BACKGROUND OF THE INVENTION

The invention also relates to improvements to electric supply devices capable of delivering without interruption AC electric energy to a load, comprising:

a transformer having a secondary assembly connectable to the load to be supplied with power, first means for connecting to a main AC electric source, these first connection means being connected to the primary assembly of the transformer, second means for connecting to an auxiliary DC electric source, these second means being connected to power oscillator means themselves connected to the primary assembly of the transformer, means for detecting a failure of the main source, control means, placed under the dependence of said detection means, for selectively controlling the supply to the primary assembly of the transformer of power either from the main source when this is in an operating condition, or from the auxiliary source when the main source has failed (cut-off), and synchronizing means associated with said control means for synchronizing the switching of the supply from one source to the other so that no discontinuity results therefrom in the AC supply of the load.

Different devices of this type are already known which, however, are of complex design and consequently expensive to manufacture.

SUMMARY OF THE INVENTION

The invention has essentially as aim to propose an uninterruptable AC electric supply process and device which answer better than those known at the present time the different requirements of the technique, the device in particular being simple in structure and so easy and cheaper to manufacture, while still providing high reliability in operation.

A first aspect of the invention relates to a process for, in an electric power supply device delivering without interruption AC energy to a load and able to be supplied from a main source and from an auxiliary emergency source, switching the supply of the load, without discontinuity or frequency jump of the AC energy delivered to the load, from the main source to the auxiliary source when a failure (cut-off) of the main source appears, and reciprocally from the auxiliary source to the main source when said failure has disappeared, the frequency of the auxiliary source being permanently synchronized with that of the main source as long as this latter is operating and which, in accordance with the invention, is characterized in that it comprises the succession of the following steps:

the appearance of a failure of the main source is detected, the load is disconnected from the main source, said load being then supplied with power by the auxiliary source in a way known per se, disappearance of the failure of the main source is detected, the frequency of the AC energy supplied by the auxiliary source is caused to drift, said frequency of the auxiliary source and the frequency of the main source are compared, the moment when these two frequencies come into coincidence is detected, and, at the moment of this coincidence, the load is again connected to the main source and supply of electric energy to the load from the auxiliary source is stopped.

Preferably, during failure of the main source, the auxiliary source supplies to the load AC energy having a frequency equal to the nominal frequency of the main source.

A second aspect of the invention relates to a power supply device of the previously mentioned type, using the above process, and which is characterized in that, for switching the power supply from the auxiliary source to power supply from the main source when a failure of this latter disappears, the synchronizing means comprise:

means for detecting the frequency of the main source, means for detecting the frequency of the power oscillator means, means for controlling the frequency drift of the power oscillator means, these frequency drift control means being under the dependence of the means for detecting the frequency of the main source, means for detecting the coincidence of the frequencies of the main source and of the power oscillator means, and synchronous switching means, placed under the control of said frequency coincidence detection means, for disconnecting the main source from the primary assembly of the transformer when a failure of the main source occurs and for reconnecting the main source to the primary assembly of the transformer when said failure has disappeared and when said frequencies coincide.

With this arrangement, switching over from one source to the other can only take place synchronously, that is to say only when the frequencies of the two sources coincide. The means used in this device are simple and inexpensive while still being reliable, in accordance with the desired aims.

Advantageously, the means for detecting a failure of the main source are voltage detection means, the means for detecting the frequency of the main source and the means for detecting the voltage of the main source are disposed in this order between the main source and the primary assembly of the transformer, and the synchronous switching means are disposed between the means for detecting the frequency and the means for detecting the voltage of the main source.

In a particular embodiment, in which the power oscillator means comprise an oscillator and a power inverter, frequency drift control means are connected to the oscillator.

In one or other of the preceding cases, when the power oscillator means comprise an oscillator and a power inverter, there may be provided between the oscillator and the power inverter a disabling member placed under the control of the means detecting the voltage of the main source so that, when said main source operates normally, the disabling means disconnect the oscillator and the power inverter whereas, should a failure of the main source occur, the disabling means connect the power inverter to the oscillator.

In a preferred embodiment, the frequency of the auxiliary source is equal to the nominal frequency of the main source, and the frequency drift control means are adapted to cause a decrease in the frequency of the auxiliary source.

The invention will be better understood from the following dexcription of one embodiment given solely by way of non limiting example, which description refers to the accompanying drawings in which:

DESCRIPTION OF THE PREFERRED EMBODIMENTS

Figure 1:
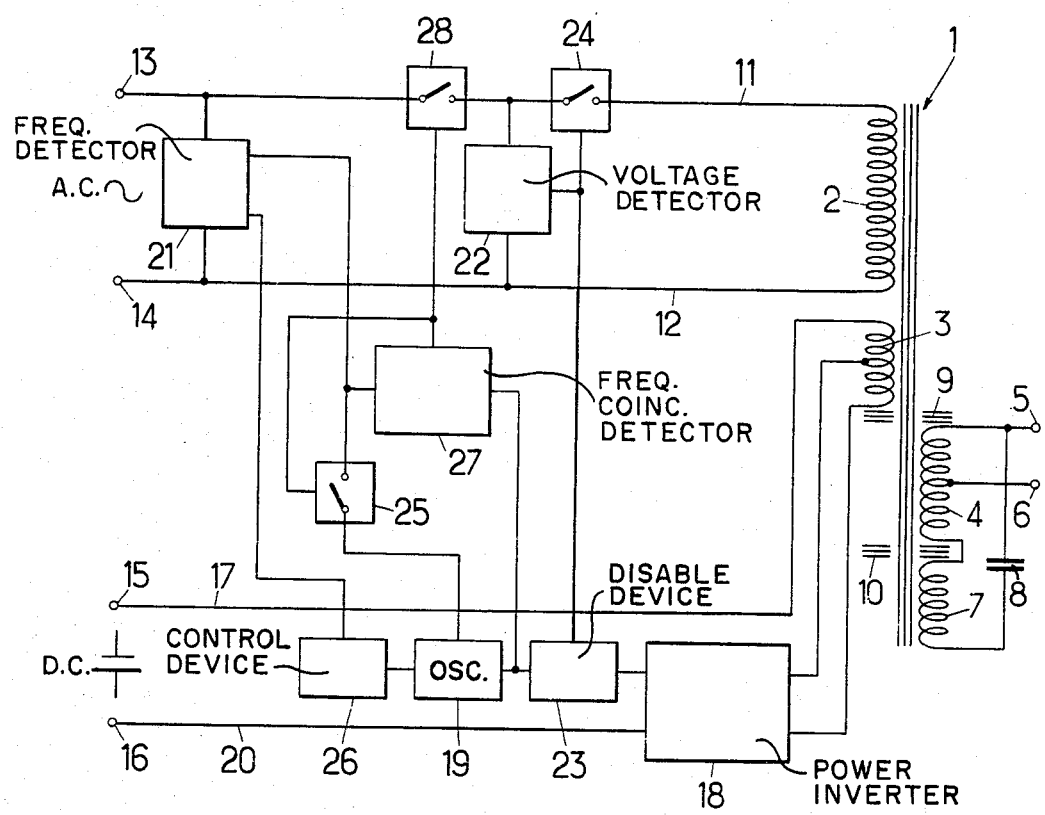
FIG. 1 is a block diagram of the power supply device in accordance with the invention.

The power supply device of the invention comprises a ferro-resonant transformer 1 with two separate primary windings 2 and 3, a secondary user winding 4 to the terminals 5, 6 of which may be connected a load (not shown) and a tuned secondary winding 7, in series with the secondary user winding 4, a tuning capacitor 8 being connected to the endmost terminals of the secondary windings 4,7. Magnetic shunts 9 and 10 having a high reluctance are provided for isolating the primary windings from the respective secondary windings. As shown in Fig. 1, primary windings 2 and 3 are both located on the same side of magnetic shunt 9 and secondary winding 4 is located on the other side of magnetic shunt 9.

The first primary winding 2 is connected, by conductors 11,12 to terminals 13,14 providing connection with an AC electric source (not shown) or main source; in practice, it is a source (such as the mains) whose frequency is likely to vary between two end limits $f_{s\ min}$ and $f_{s\ max}$ (for example 50 Hz±2 Hz).

The second primary winding 3 is connected in the following way to terminals 15, 16 for providing the connection with a DC electric source (not shown) or auxiliary emergency source, generally formed by batteries of accumulators: one of the terminals (15 in FIG. 1) is connected by a conductor 17 to the middle point of the second primary winding 3, whereas the ends of said winding are connected respectively to the output terminals (in phase opposition) of a power inverter 18, for example of the push-pull type, driven by an oscillator 19; furthermore, the power input of inverter 18 is connected by a conductor 20 to terminal 16.

Of course, the AC input 13,14 and the DC input 15,16 may advantageously be equipped with any appropriate protection and filtering devices (not shown).

Oscillator 19 may be of any known type; in particular it may be formed by a relaxation oscillator with RC circuit and unijunction transistor which lends itself readily to external synchronization. It supplies a signal having a nominal frequency $f_0$ which is equal to the nominal value of the frequency of the main source.

To the terminals of the first primary winding 2 are connected in parallel, and in the order indicated, a detector 21 for detecting the frequency of the main source and situated on the same side as connection terminals 13,14 and a detector 22 for detecting the voltage of the main source and situated on the same side as the primary winding 2. The voltage detector is of the type which rapidly detects the voltage drop of one half wave below a predetermined value (for example −10% or −15% of the nominal value), different possible arrangements of which are known to a man skilled in the art.

The output of the voltage detector 22 is connected to the control input of a disabling device 23 inserted in series between oscillator 19 and the power inverter 18; the disabling device 23 allows the oscillator 19 and the inverter 18 to be connected to one another or on the contrary to be isolated from one another depending on the control signal which is applied thereto by detector 22.

The output of voltage detector 22 is also connected to the control input of a first switch 24 inserted in line 11 between the primary winding 2 and the connection point between line 11 and detector 22. Switch 24 may advantageously be a semiconductor element switch such as two thyristors disposed head to tail in parallel in a conventional circuit.

One output of the frequency detector 22 is connected to a control device 26 whose output is connected to oscillator 19 and which is adapted to cause the frequency of oscillator 19 to drift (or slide) more especially in the direction of a frequency reduction from the nominal frequency of the oscillator. Another output of the frequency detector 21 is connected, on the one hand, to the synchronizing input of oscillator 19 through switch 25 for synchronizing this latter with the main AC source and, on the other hand, to the input of a device 27 detecting the coincidence of the frequency of the main source and the frequency of oscillator 19, this device 27 receiving at a second input the signal supplied by oscillator 19. The output of the coincidence detection device 27 is connected, on the one hand, to the control input of switch 25 and, on the other hand, to the control input of a second switch 28, so-called synchronous switch, inserted in series in line 11 between the junction points of line 11 with the frequency detector 21 and the voltage detector 22, respectively. The synchronous switch 28 may be formed on the same model as switch 24, in the form of two head to tail thyristors connected in parallel.

The operation of the power supply device of the invention is the following.

Under normal operation, that is to say the main AC source normally supplying terminals 13,14, oscillator 19 receives synchronization pulses from the frequency detector 21; thus, oscillator 19 is exactly in phase with the main source and a coincidence detection device 27 compares two signals having exactly the same frequency. It then generates an output signal which closes switches 28 and 25.

The voltage detector 22 detects a voltage between lines 11, 12 and it therefore generates an output signal whhich maintains switch 24 in the closed position, but which maintains the disabling device 23 in the disabling position; in other words, the power inverter 18 is not connected to oscillator 19 and so it is not operative.

The result is that the second primary winding 3 of the transformer is not live and that only the first primary winding 2 of the transformer is supplied with power: the load is supplied with power solely from the main AC source.

As soon as a power voltage drop in the main AC source appears, the voltage detector 22 detects the absence of voltage between lines 11 and 12 and immediately generates an output signal. The output signal causes, on the one hand, device 23 to be enabled resulting in power inverter 18 being driven by oscillator 19 and supplying the second primary winding 3 of the transformer with power and, on the other hand, switch 24 to open so as to avoid reinjection, due to the coupling of the primary windings 2 and 3 into lines 11,12, of a signal coming from winding 3, which signal would prevent the correct operation of the device.

Simultaneously, the frequency detector 21 no longer supplies synchronization to oscillator 19 which then oscillates freely at its nominal frequency $f_0$, and the coincidence detection device, no longer receiving the reference signal, generates an output signal causing the synchronous switch 28 and switch 25 to open.

The result is that only the second primary winding 3 of the transformer is live; the load is supplied with power solely from the auxiliary DC source. Because the response time of the voltage detector is less than the desaturation time of the ferro-resonant transformer during cut-off (i.e. 2 to 3 ms), the power inverter takes the place of the main source without breaking the supply to the load.

When the break disappears and when terminals 13,14 are again supplied with voltage, the frequency detector 21 supplies an output signal which is applied to the corresponding input of the frequency coincidence detector 27; however, since the frequency of the main source is in general different from the free oscillator frequency of oscillator 19, the output of the frequency coincidence detector 27 is not modified and switch 28 remains in the open state. Thus, no voltage exists between lines 11 and 12 at the terminals of the voltage detector 22 which maintains switch 24 open and device 23 enabled.

Simultaneously, the output signal of the frequency detector 21 is applied to device 26 which controls the frequency drift or slide of oscillator 19. The frequency of the oscillator decreases until it coincides with the frequency of the main source: at that moment, the frequency coincidence detector 27 generates an output signal which causes simultaneously, on the one hand, switch 25 to close so as to apply a synchronizing pulse to the synchronizing input of the oscillator, the oscillator then entering a forced oscillation operating phase and, on the other hand, the synchronous switch 28 to close. The voltage detector 22, now supplied with voltage, causes simultaneously, on the one hand, device 23 to be disabled and thus the supply to the second primary winding 3 to be stopped and, on the other hand, switch 24 to be closed and thus causing the first primary winding 2 to be supplied with power.

With this device, switching of the electric energy supply from the second primary winding 3 to the first primary winding 2 only takes place when there is coincidence of the respective frequencies of the oscillator and of the main source, independently of the moment when the break disappears, with continuity in the half-wave during which the switching takes place.

Figure 2:
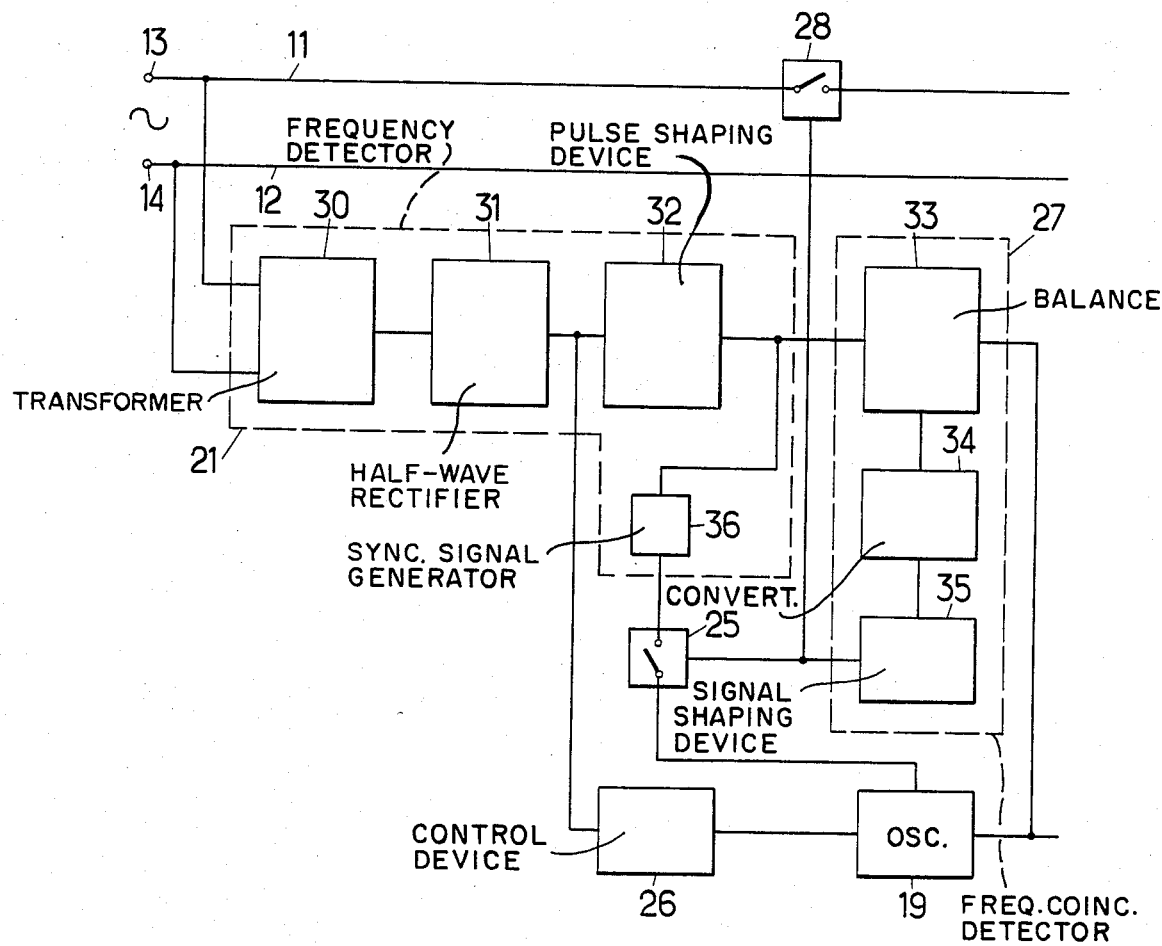
FIG. 2 is a block diagram of a particular embodiment of a part of the device of FIG. 1.

FIG. 2 shows schematically a preferred embodiment of a part of the device of FIG. 1 (the same numerical references have been kept to designate the elements identical with those of FIG. 1).

The frequency detector 21 comprises a voltage dropping transformer 30 whose primary winding is connected to conductors 11,12 and whose secondary winding is connected to a half-wave rectifier device 31. The output of this latter is connected to the input of a shaping device 32 which delivers positive rectangular pulses corresponding to the positive half-waves supplied by the rectifier device 31 and having then the same frequency as the AC signal appearing at terminals 13,14.

The output of the shaping device 32—which also forms an output of the frequency detector 21—is connected, on the one hand, to an input of a balance 33 whose other input is connected to the output of oscillator 19—the two inputs of balance 33 also forming the two inputs of the frequency coincidence device 27—and, on the other hand, to a synchronizing signal generator 36 which forms pulses from the positive half-waves outputted by device 32. The output of generator 36 is connected to the synchronizing input of oscillator 19 through switch 25, as has already been mentioned.

By way of example, balance 33 may be formed from two transistors connected in opposition, with emitters joined together, whose bases form the two said inputs and whose collectors are connected respectively to the terminals of a diode bridge. MOS type field effect transistors may advantageously be used for this purpose.

The output of balance 33 is connected to the input of a converter 34 transforming the signal delivered by the balance into an all or nothing signal, converter 34 being for example a photoelectronic converter such as a light emitting diode-phototransistor pair.

Finally, the output of converter 34 is connected to a device 35 for shaping the signal whose output is connected to the control inputs of switches 25 and 28.

The output of the half-wave rectifier device 31 is also connected to the control device 26, as already mentioned.

As is evident and as it follows moreover already from what has gone before, the invention is in no wise limited to those of its modes of application and embodiments which have been more especially considered; it embraces, on the contrary, all variations thereof.

I claim:

1. A process for, in an electric power supply device delivering AC energy to a load without interruption and capable of being supplied by a main source and an auxiliary emergency source, switching the supply of the load from the main source to the auxiliary source, without discontinuity or frequency jump in the AC energy delivered to the load, when a failure (break) appears in the main source and reciprocally from the auxiliary source to the main source when said failure disappears, characterized in that it comprises the succession of the following steps:

the appearance of a failure of the main source is detected, the load is disconnected from the main source, said load then being supplied by the auxiliary source in a way known per se, disappearance of the failure of the main source is detected, the frequency of the AC energy supplied by the auxiliary source is caused to drift, said frequency of the auxiliary source and the frequency of the main source are compared, the moment when these two frequencies come into coincidence is detected, and, at the moment of this coincidence, the load is again connected to the main source and the supply of electric energy to the load from the auxiliary source is stopped.

2. The process according to claim 1, characterized in that, during the failure of the main source, the auxiliary source supplies to the load AC energy having a frequency equal to the nominal frequency of the main source and in that the frequency drift of the auxiliary source takes place in the direction of a reduction in frequency.

3. An electric supply device capable of delivering AC electric energy to a load without interruption, comprising a transformer (1) having a secondary assembly connectable to the load to be supplied, first means (13,14) for connection to a main AC electric source, these first connection means being connected to the primary assembly of the transformer, second means (15,16) for connection to an auxiliary DC electric source, these second means being connected to power oscillator means (18,19) themselves connected to the primary assembly of the transformer, means (22) for detecting a failure of the main source, control means (23,24), made dependent on said detecting means, for selectively controlling the power supply of the primary assembly of the transformer either from the main source when this latter is in the operating condition, or from the auxiliary source when the main source is broken down (cut off), and synchronizing means associated with said control means for synchronizing the switching of the supply from one source to the other so that there results therefrom no discontinuity in the AC power supply to the load, characterized in that, for switching from the supply from the auxiliary source to the supply from the main source when a failure of this latter disappears, the synchronizing means comprise:

means (21) for detecting the frequency of the main source, means for detecting the frequency of the power oscillator means, means (26) for controlling the frequency drift of the power oscillator means (18,19), these frequency drift controlling means being under the dependence of the means (21) for detecting the frequency of the main source, means (27) for detecting the coincidence of the frequencies of the main source and of the power oscillator means, and synchronous switch means (28) placed under the control of said frequency coincidence detection means, for disconnecting the main source from the primary assembly of the transformer when a failure of the main source occurs and for reconnecting the main source to the primary assembly of the transformer when said failure has disappeared and when said frequencies coincide.

4. The device according to claim 3, characterized in that the means (22) for detecting a failure of the main source are voltage detection means, in that the means (21) for detecting the frequency of the main source and the means (22) for detecting the voltage of the main source are disposed in this order between the main source and the primary assembly of the transformer, and in that the synchronous switch means (28) are disposed between the means for detecting the frequency and the means for detecting the voltage of the main source.

5. The device according to claim 3, wherein the power oscillator means comprise an oscillator (19) and a power inverter (18), characterized in that the frequency drift controlling means are connected to the oscillator.

6. The device according to claim 3, wherein the power oscillator means comprise an oscillator (19) and a power inverter (18), characterized in that between the oscillator and the power inverter is disposed a disabling member (23) placed under the control of the means for detecting the voltage of the main source, so that, when said main source operates normally, the disabling means disconnect the oscillator and the power inverter whereas, should a failure of the main source occur, the disabling means connect the power inverter to the oscillator.

7. The device according to claim 3, characterized in that the frequency of the auxiliary source is equal to the nominal frequency of the main source and in that the frequency drift controlling means are adapted to cause a reduction of the frequency of the auxiliary source.

8. The device according to claim 3, characterized in that the primary assembly of the transformer 30 (1) comprises a first primary winding (2) connected to said first connection means and a second primary winding (3) connected to said second connection means.

9. The device according to claim 3, characterized in that the transformer is a ferro-resonant transformer.

10. The device according to claim 8 characterized in that said transformer further includes a magnetic shunt for isolating said first and second primary windings from said transformer secondary assembly, and characterized in that said first and second primary windings are located on the same one side of said shunt.

11. The device according to claim 10 characterized in that said transformer secondary assembly comprises a secondary winding connectable to the load, said secondary winding located on the other side of said shunt.

* * * * *